United States Patent [19]
Taylor et al.

[11] Patent Number: 5,850,829
[45] Date of Patent: Dec. 22, 1998

[54] ADJUSTABLE GRILL STAND

[76] Inventors: Diana Taylor; Bob Taylor, both of 307 Short Columbia St., Monroe, Wash. 98272

[21] Appl. No.: 19,169

[22] Filed: Feb. 5, 1998

[51] Int. Cl.[6] ............................... A47J 37/00; F24B 3/00
[52] U.S. Cl. ........................ 126/30; 126/9 R; 126/25 A
[58] Field of Search .................................. 126/29 R, 30, 126/25 A, 25 AA, 9 R; 99/450

[56] References Cited

U.S. PATENT DOCUMENTS

| | | | |
|---|---|---|---|
| 4,043,260 | 8/1977 | LaPour | 126/30 |
| 4,120,280 | 10/1978 | Iverson | 126/30 |
| 4,146,010 | 3/1979 | Manska | 126/30 |
| 4,732,138 | 3/1988 | Vos | 126/30 |
| 5,025,715 | 6/1991 | Sir | 126/30 |

FOREIGN PATENT DOCUMENTS 2437186  5/1980  France ...................................... 126/30

*Primary Examiner*—James C. Yeung

[57] ABSTRACT

A camping fire cooking and utility stand is provided including at least one leg. A cross bar is mounted to a top of the leg and extends therefrom with a plurality of hangers spacedly coupled thereto for hanging various utensils therefrom. Further provided is a grill plate coupled to the leg.

5 Claims, 2 Drawing Sheets

ADJUSTABLE GRILL STAND

BACKGROUND OF THE INVENTION

1. Field of the Invention

The present invention relates to camping grill stands and more particularly pertains to a new adjustable grill stand for affording both an adjustable grilling surface and utility hanging apparatus.

2. Description of the Prior Art

The use of camping grill stands is known in the prior art. More specifically, camping grill stands heretofore devised and utilized are known to consist basically of familiar, expected and obvious structural configurations, notwithstanding the myriad of designs encompassed by the crowded prior art which have been developed for the fulfillment of countless objectives and requirements.

Known prior art camping grill stands include U.S. Pat. No. 4,726,349; U.S. Pat. Des. 337,933; U.S. Pat. No. 5,406,931; U.S. Pat. No. 4,796,599; and U.S. Pat. No. 5,307,797.

In these respects, the adjustable grill stand according to the present invention substantially departs from the conventional concepts and designs of the prior art, and in so doing provides an apparatus primarily developed for the purpose of affording both a grilling surface and utility hanging apparatus.

SUMMARY OF THE INVENTION

In view of the foregoing disadvantages inherent in the known types of camping grill stands now present in the prior art, the present invention provides a new adjustable grill stand construction wherein the same can be utilized for affording both a grilling surface and utility hanging apparatus.

The general purpose of the present invention, which will be described subsequently in greater detail, is to provide a new adjustable grill stand apparatus and method which has many of the advantages of the camping grill stands mentioned heretofore and many novel features that result in a new adjustable grill stand which is not anticipated, rendered obvious, suggested, or even implied by any of the prior art camping grill stands, either alone or in any combination thereof.

To attain this, the present invention generally comprises a plurality of legs each having a lower extent which is vertically oriented and has a first length. An intermediate extent of each leg is slanted upwardly and inwardly and has a second length that is three times the first length. Associated therewith is an upper extent which is vertically oriented and has a third length half the first length. Each of the legs has a top end coupled to a disk such that the legs are spaced with respect to each other and further rested on a ground surface about a camping fire. Also included is a horizontally oriented cross bar mounted to the disk and extended outwardly from diametrically opposed points. The cross bar has a plurality of hangers spacedly coupled to a bottom thereof for hanging various utensils therefrom. Note FIG. 1. FIG. 1 further shows a grill assembly including a pulley mounted to a bottom of the disk. A circular planar grill has a plurality of secondary cables each having a first end coupled about a periphery of the grill and a second end coupled together. A primary cable has a first end coupled to the seconds end of the secondary cables and a second end with a sphere mounted thereon. A plurality of hooks are spacedly coupled along the intermediate extent of one of the legs. As shown in FIG. 4, the primary cable is situated about the pulley and the sphere is situated beneath one of the hooks for maintaining the grill at a predetermined elevation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable grill stand apparatus and method which has many of the advantages of the camping grill stands mentioned heretofore and many novel features that result in a new adjustable grill stand which is not anticipated, rendered obvious, suggested, or even implied by any of the prior art camping grill stands, either alone or in any combination thereof.

It is another object of the present invention to provide a new adjustable grill stand which may be easily and efficiently manufactured and marketed.

It is a further object of the present invention to provide a new adjustable grill stand which is of a durable and reliable construction.

An even further object of the present invention is to provide a new adjustable grill stand which is susceptible of a low cost of manufacture with regard to both materials and labor, and which accordingly is then susceptible of low prices of sale to the consuming public, thereby making such adjustable grill stand economically available to the buying public.

Still yet another object of the present invention is to provide a new adjustable grill stand which provides in the apparatuses and methods of the prior art some of the advantages thereof, while simultaneously overcoming some of the disadvantages normally associated therewith.

Still another object of the present invention is to provide a new adjustable grill stand for affording both a grilling surface and utility hanging apparatus.

Even still another object of the present invention is to provide a new adjustable grill stand that includes at least one leg. A cross bar is mounted to a top of the leg and extends therefrom with a plurality of hangers spacedly coupled thereto for hanging various utensils therefrom. Further provided is a grill plate coupled to the leg.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
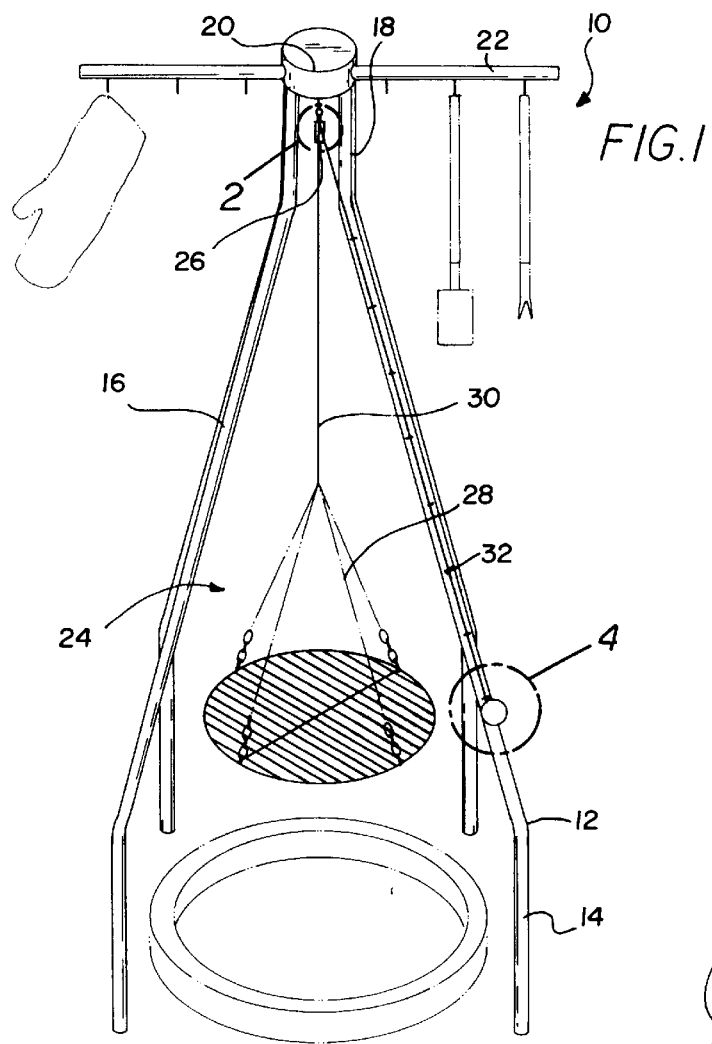
FIG. 1 is a perspective view of a new adjustable grill stand according to the present invention.
Figure 2:
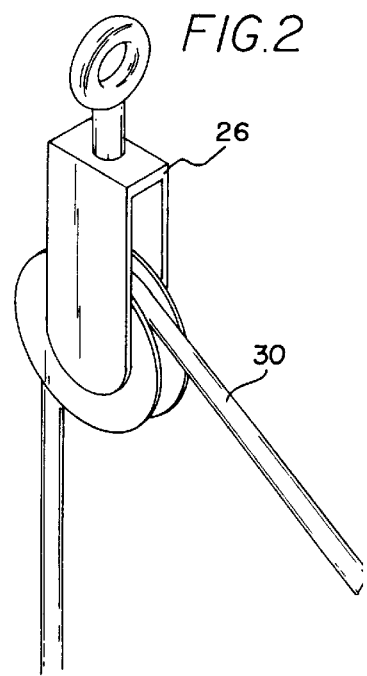
FIG. 2 is a detailed perspective view of the pulley of the present invention.
Figure 3:
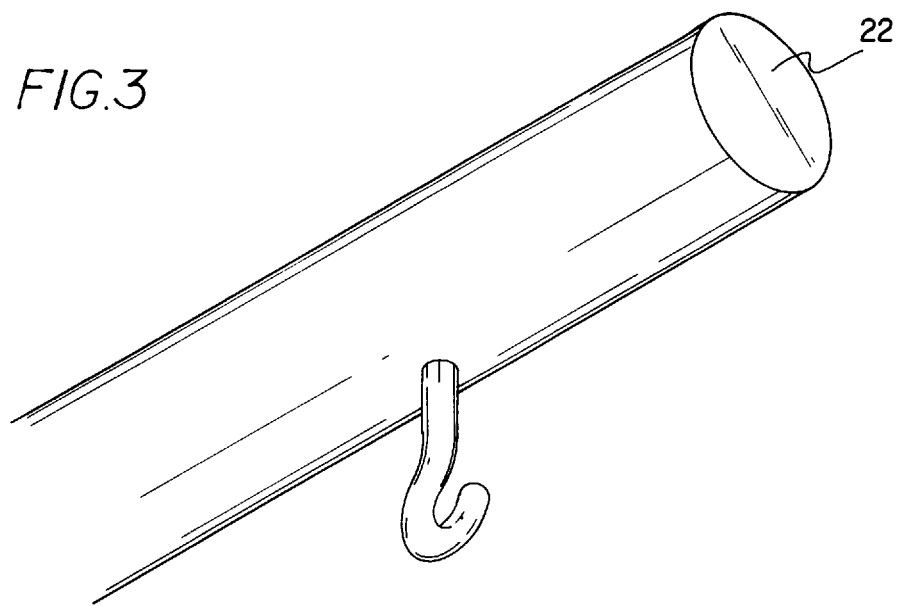
FIG. 3 is a perspective view of one of the hangers of the present invention.

With reference now to the drawings, and in particular to FIGS. 1 through 4 thereof, a new adjustable grill stand embodying the principles and concepts of the present invention and generally designated by the reference numeral 10 will be described.

The present invention, designated as numeral 10, includes a plurality of legs 12 each having a lower extent 14 which is vertically oriented and has a first length. An intermediate extent 16 of each leg is slanted upwardly and inwardly and has a second length that is three times the first length. Associated therewith is an upper extent 18 which is vertically oriented and has a third length half the first length. It should be noted that each extent of the legs is rigid and linear. Further, four legs are preferably employed.

Each of the legs has a top end coupled to a disk 20 such that the legs are spaced with respect to each other and further rested on a ground surface about a camping fire.

Also included is a horizontally oriented cross bar 22 mounted to the disk and extended outwardly from diametrically opposed points. The cross bar has a plurality of hangers spacedly coupled to a bottom thereof for hanging various utensils therefrom. Note FIG. 1. In the preferred embodiment, the cross bar has a length equal to a distance between bottom extents of opposed legs.

FIG. 1 further shows a grill assembly 24 including a pulley 26 mounted to a bottom of the disk. To accomplish this, the disk is equipped with a hook while the pulley has a clevis and eyelet. A circular planar grill has a plurality of secondary cables 28, or chains each having a first end coupled about a periphery of the grill and a second end coupled together. A primary cable 30 has a first end coupled to the seconds end of the secondary cables and a second end with a sphere mounted thereon.

Figure 4:
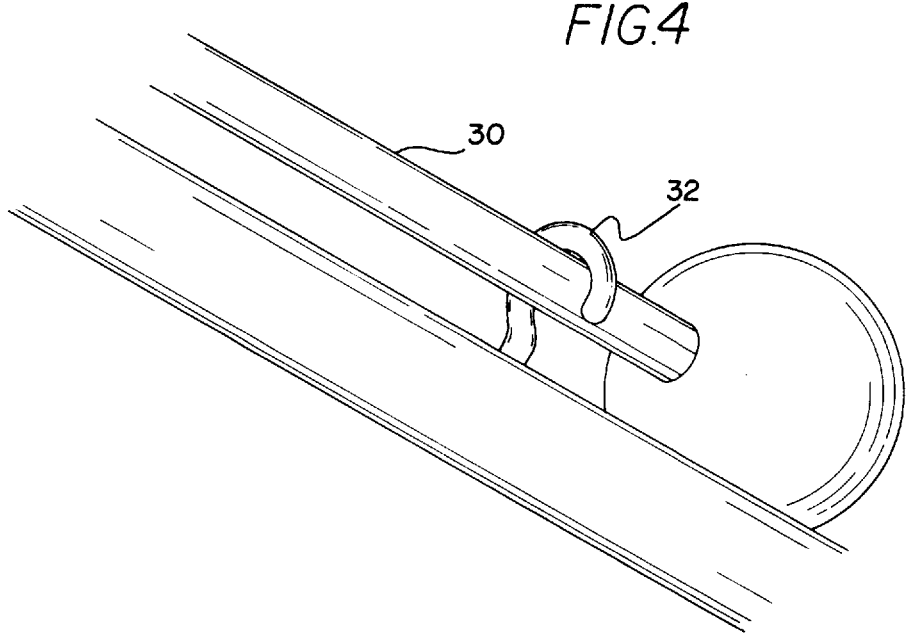
FIG. 4 is a perspective view of one of the legs of the present invention.

A plurality of hooks 32 are spacedly coupled along the intermediate extent of one of the legs. As shown in FIG. 4, the primary cable is situated about the pulley and the sphere is situated beneath one of the hooks for maintaining the grill at a predetermined elevation. To accomplish this, the sphere has a diameter which is greater than that associated with the hooks. As shown in FIG. 1, adjustment hooks are mounted along an entirety of the intermediate extent of the designated leg.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A camping fire cooking and utility stand comprising, in combination:

four legs each having a lower extent which is vertically oriented and has a first length, an intermediate extent which is slanted upwardly and inwardly and has a second length that is three times the first length, and an upper extent which is vertically oriented and has a third length half the first length, each of the legs having a top end coupled to a member such that the legs are spaced with respect to each other and further rested on a ground surface about a camping fire, wherein each extent of the legs is linear;

a horizontally oriented cross bar mounted at a central extent thereof to the member and extending from diametrically opposed points, the cross bar having a plurality of hangers spacedly coupled to a bottom thereof for hanging various utensils therefrom, wherein the cross bar has a length equal to a distance between the bottom extents of the legs; and a grill assembly including a pulley with a clevis and an eyelet mounted to a hook at a bottom of the member, a circular planar grill having a plurality of secondary chains each having a first end coupled about a periphery of the grill and a second end coupled together, a primary cable having a first end coupled to the seconds end of the secondary chains and a second end with a sphere mounted thereon, and a plurality of hooks spacedly coupled along the intermediate extent of one of the legs, whereby the primary cable is situated about the pulley and the sphere is situated beneath one of the hooks for maintaining the grill at a predetermined elevation, wherein a diameter of the sphere is greater than that of the hooks.

2. A camping fire cooking and utility stand comprising, in combination:

at least four legs;

a cross bar mounted at a central extent thereof to a top of the legs and extending therefrom with a plurality of hangers spacedly coupled thereto for hanging various utensils therefrom, wherein the cross bar has a length equal to a distance between a bottom of the legs; and a grill plate coupled to the legs;

wherein the grill plate has an adjustable height and is elevated by way of a connector and a pulley;

wherein the connector has a bulb mounted thereon for maintaining the grill at a constant elevation via a plurality of hooks spacedly mounted on one of the legs, wherein a diameter of the bulb is greater than that of the hooks.

3. A camping fire cooking and utility stand as set forth in claim 2 wherein the connector includes a plurality of interconnected secondary connectors and a primary connector.

4. A camping fire cooking and utility stand as set forth in claim 2 wherein the legs are each equipped with a vertical bottom extent and an angled top extent.

5. A camping fire cooking and utility stand as set forth in claim 2 wherein the connector includes a cable.

* * * * *